April 15, 1969  R. L. BALLARD ET AL  3,438,130
VERTICAL GRIP GRASS SHEARS

Filed May 11, 1967

*INVENTORS*
Robert L. Ballard
James E. Edgell
Patrick M. Handke
John T. Loechner

ATTORNEYS

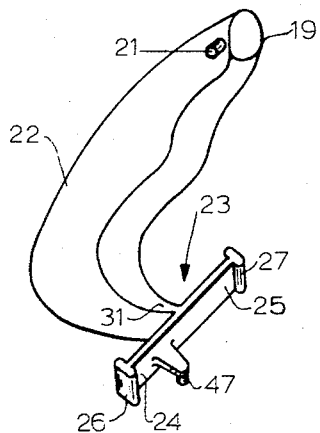
FIG. 7
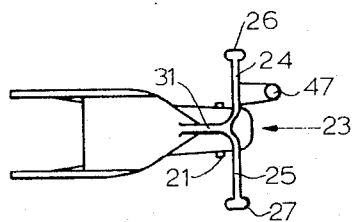
FIG. 8
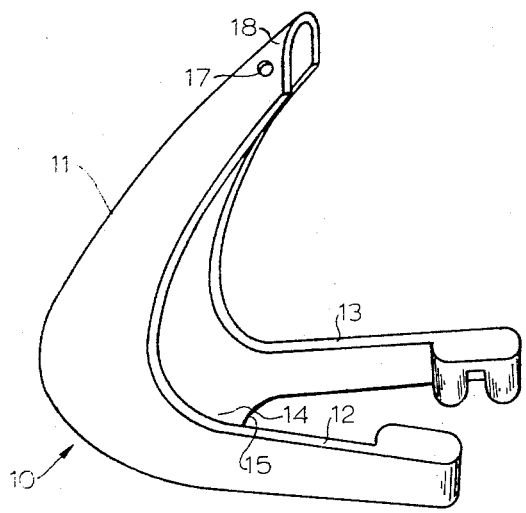
FIG. 9
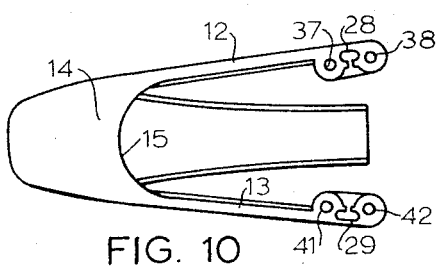
FIG. 10
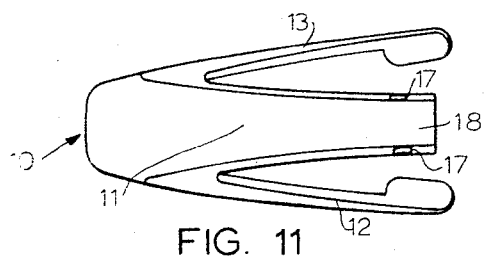
FIG. 11
INVENTORS
Robert L. Ballard
James E. Edgell
Patrick M. Handke
John T. Loechner
ATTORNEYS INVENTORS
Robert L. Ballard
James E. Edgell
Patrick M. Handke
John T. Loechner
ATTORNEYS

United States Patent Office 3,438,130
Patented Apr. 15, 1969

3,438,130
VERTICAL GRIP GRASS SHEARS
Robert L. Bailard, Pittsburgh, James E. Edgell, Wexford, Patrick M. Handke, Pittsburgh, and John T. Loechner, Allison Park, Pa., assignors to H. K. Porter Company, Inc., Pittsburgh, Pa., a corporation of Delaware
Filed May 11, 1967, Ser. No. 637,706
Int. Cl. B26b 13/16, 13/18
U.S. Cl. 30—235      12 Claims

ABSTRACT OF THE DISCLOSURE

Grass shears are provided with a pair of cooperating cutting blades disposed in a horizontal plane and a trigger and trigger housing positioned perpendicularly on top of and to the rear of the blades. The trigger and trigger housing have their upper extremities pivotally connected and their lower extremities associated with the cutting blades whereby upon the squeezing of the trigger and trigger housing, the cutting blades close in a shearing relationship.

BACKGROUND OF THE INVENTION

Field of the invention

This invention is concerned with improvements in the construction of grass shears and, primarily, with the construction of the trigger housing and trigger mechanism which actuates the cutting blades. Such devices are sometimes classified under shears with pivoted blades (Class 30, sub 244), shears with pivoted blades and having moving means (Class 30, sub 245), shears with pivoted blades having moving means of the push or pull type (Class 30, sub 246), and at other times as shears with pivoted blades and with blade moving means and having an offset blade and handle (Class 30, sub 248).

Description of the prior art

The grass shears of the prior art generally include a pair of blades pivotally connected to a frame and a trigger pivotally connected to the frame in the area adjacent the blades and also connected to the blades so that upon the squeezing of the rear portions of the handle and trigger, the blades close so as to shear a particular work object. While constructions of this type are adequate for some cutting opreations, the prior art handle portions are always substantially parallel to the cutting blades so that upon the cutting of high or hard-to-reach objects, the operator suffers fatigue in his wrist joints due to the necessary bending of the same in order to position the cutting blades adjacent the object to be sheared. A reference of this type is Patent 2,954,605 to March et al.

Patent 3,110,963 to Lewandowski discloses an aquarium plant cleaner which is comprised of a pair of cooperating cutting blades, an elongated handle portion and a trigger which resides in the handle portion and which is connected to the blades. The trigger also includes a spring which is mounted in the handle portion and which is adapted to return the trigger and the blades to their normal static position upon the release of the trigger. It can be seen that the hand receiving portion of the handle is substantially parallel to the blades and even though the trigger is pivoted about some point away from the cutting blades, it is obvious that this apparatus could not be modified so that the trigger and handle portions would be vertically arranged with respect to the horizontally arranged cutting blades.

SUMMARY OF THE INVENTION

The present invention is primarily directed to grass shears which include a pair of horizontally disposed cutting blades and a U-shaped trigger and trigger housing which is vertically arranged with respect to the cutting blades. Such an arrangement aligns the knuckles so that they are perpendicular to the cutting blades. The trigger is pivotally connected at its upper end to the trigger housing so that it may work in the lower cavity portion of the trigger housing. The lower end of the trigger is connected by means to the blades such that upon the pivotal movement of the trigger inwardly toward the interior of the trigger housing, the blades close and are adapted to shear a particular work object.

The concept of providing grass shears with a vertically mounted trigger in which the upper portion of the same is pivotally connected to the trigger housing is extremely versatile in application and four embodiments of the same are hereindisclosed. In the first embodiment, the trigger housing which includes a vertical portion for receiving the trigger also includes a pair of horizontally disposed arms each of which rigidly receives a cutting blade. The lower extremity of the trigger includes a T-shaped extension, the ends of which are connected to the extremities of the arms so that upon the squeezing of the trigger and trigger housing, the blades are drawn together in a shearing motion. The second embodiment is substantially like the first embodiment with the exceptions being that the blades are pivotally connected together at their rearward ends and a U-shaped spring is mounted within the trigger housing such that each leg of the U-shaped spring is mounted adjacent a respective arm member of the trigger housing. The third embodiment of this invention includes a trigger housing mounting a trigger in the vertical plane with the trigger being pivotally connected to the housing at the upper extremity thereof and a pair of horizontally disposed cooperating cutting blades which are pivotally connected to each other and the trigger housing along the lower surface of the same. The trigger extends through the lower portion of the trigger housing and connects to the cutting blade such that upon the squeezing of the trigger and trigger housing, the blades close in a shearing relationship. This embodiment is also provided with a type of leaf spring which resides in the back of the trigger housing and engages a portion of the trigger upon the inward movement of the same. In the fourth embodiment of this invention, the trigger, the trigger housing and leaf spring are arranged in substantially the same way as in the third embodiment with the exception that the trigger does not extend through the floor of the trigger housing. One blade is rigidly secured to the trigger housing base plate while the other blade is pivotally mounted thereon and arranged so as to move relative the rigidly positioned blade. The pivotally mounted blade is connected to the trigger by a linkage such that upon the inward movement of the trigger, the pivoted blade swings toward the stationary blade so as to shear a work object.

Therefore, an object of this invention is to provide grass shears which have the cutting blades thereof disposed in a horizontal plane and the trigger housing and trigger disposed in a vertical plane such that when the operator grasps the trigger and trigger housing, the knuckles of his hand trace a line which is perpendicular to the plane in which the blades reside.

Another object of this invention is to provide grass shears with a trigger housing having flexible arm portions which receive the shearing blades whereby upon the closing of the blades and the releasing of the trigger, the resilient arms of the trigger housing return the cutting blades to their original open position.

A further object of this invention is to provide grass shears which are extremely light and which are easy and comfortable to operate and do not fatigue the user.

A still further object of this invention is to provide grass shears which are comprised essentially of a thermoplastic with the exception of the cutting blades and the means for connecting the cutting blades to the trigger housing.

Yet a further object of this invention is to provide grass shears with a pair of cutting blades which are freely movable relative each other and with a trigger housing which embodies a spring action for returning the blades after the shearing stroke to their starting position.

These and other objects will become apparent when the following description is read in conjunction with the drawings, in which:

DESCRIPTION OF THE DRAWINGS

FIGURE 7 is a pictorial view of the trigger used in the first and second embodiments;

FIGURE 8 is a bottom view of the trigger of FIGURE 7 showing the T-shaped blade connections and the locking pin;

FIGURE 9 is a pictorial view of the trigger housing of the first embodiment of this invention showing the arms for supporting the cutting blades and the cavity for receiving the trigger;

FIGURE 10 is a bottom view of the trigger housing of FIGURE 9;

FIGURE 11 is a plan view of the trigger housing of FIGURE 9;

DETAILED DESCRIPTION OF THE PREFERRED EMBODIMENTS

Figure 1:
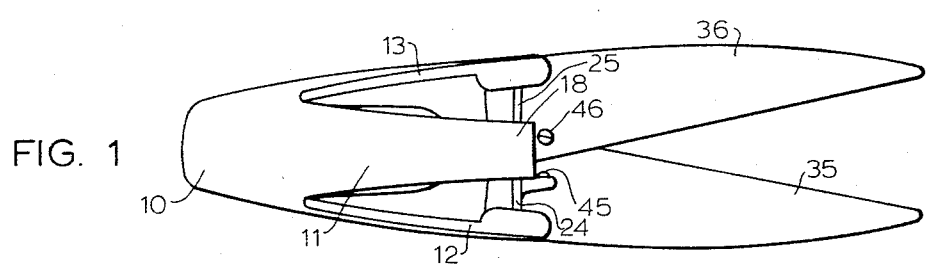
FIGURE 1 is a plan view of the grass shears of the first embodiment of this invention showing the shears in an open or normally at rest position.

In the first embodiment of this invention, a substantially U-shaped trigger housing 10 is comprised of an arcuated body portion 11 which forms a cavity for receiving trigger 20 and is further comprised of blade support or base arms 12 and 13. Base arms 12 and 13 comprise a substantially U-shaped structure when viewing the same in the plan view and are comprised of a resilient thermoplastic such as polypropylene so that upon the deformation of the same, the base arms tend to return to their original open position. Floor or base portion 14 of trigger housing 10 includes an arcuated edge 15 which tends to add resiliency to base arms 12 and 13 since base arms 12 and 13 are integral extensions of the same. An upper or apex portion 18 of housing 10 lies forward of body portion 11 and substantially opposite base portion 14 and is provided with openings 17 for receiving hinge pin 21 of trigger 20.

Trigger 20 is substantially U-shaped having a first and upper end 19, a body or hand receiving portion 22 and a T-shaped extension 23 which is adapted to engage base arms 12 and 13. Hand portion 22 resides in body portion 11 of trigger housing 10. T-shaped portion 23 is comprised of right leg or end 24, left leg or end 25 and stem 31 with right and left legs 24, 25 having, respectively, appended knobs 26 and 27. Knobs 26 and 27 respectively reside in openings 28 and 29 of base arms 12 and 13. Trigger 20 is thus supported in trigger housing 10 by pins 21 and T member 23 which has its knobs 26 and 27 secured to base arms 12 and 13.

Blades 35 and 36 are respectively mounted on base arms 12 and 13 by having threaded holes 37 and 38 receive screws 39 and 40, respectively, and by having threaded holes 41 and 42 threadably receive screws 43 and 44, respectively. Blade 35 is provided with opening 45 and blade 36 is provided with opening 46 which can be axially aligned with opening 45 when blades 35 and 36 are moved to an extreme inward position for storage. Flexible pin 47 which is connected to the T-shaped extension 23 is adapted to be received by openings 45 and 46 and when so inserted is adapted to maintain blades 35 and 36 in a closed and safe position.

Figure 2:
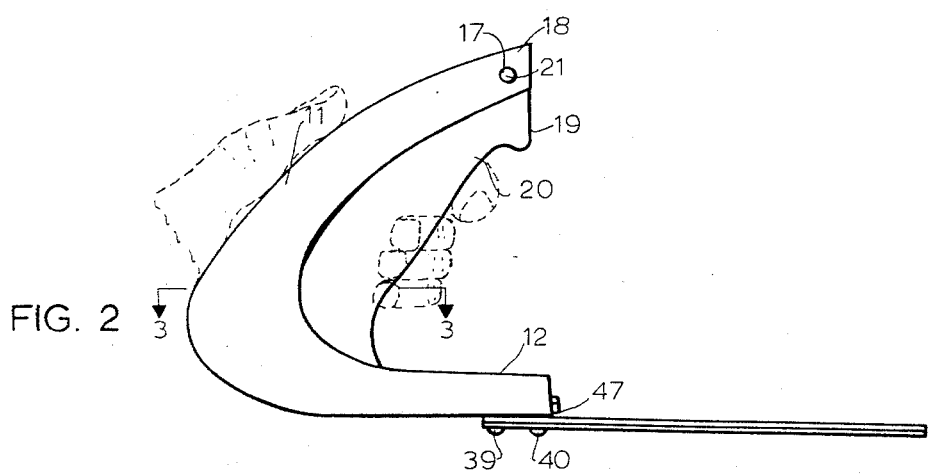
FIGURE 2 is a side elevation view of the first embodiment showing the trigger being pivotally connected to the trigger housing at a point which is substantially above the horizontal plane in which the cutting blades reside.
Figure 3:
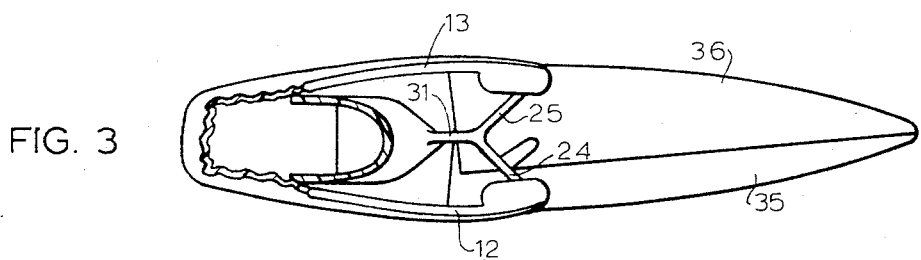
FIGURE 3 is a section view taken along lines 3—3 of FIGURE 2 and showing the cutting blades having been drawn into a closed position by means of the T-shaped extension of the trigger.
Figure 4:
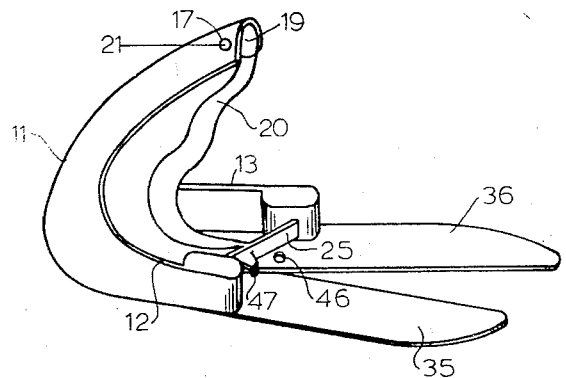
FIGURE 4 is a pictorial view of the first embodiment of this invention showing the cutting blades in a normally open position.
Figure 5:
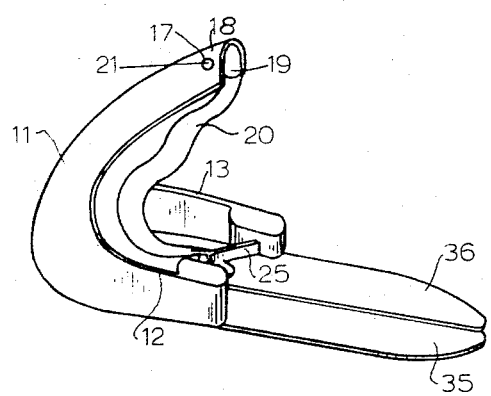
FIGURE 5 is a pictorial view of the first embodiment of this invention showing the cutting blades in a closed locked position.
Figure 6:
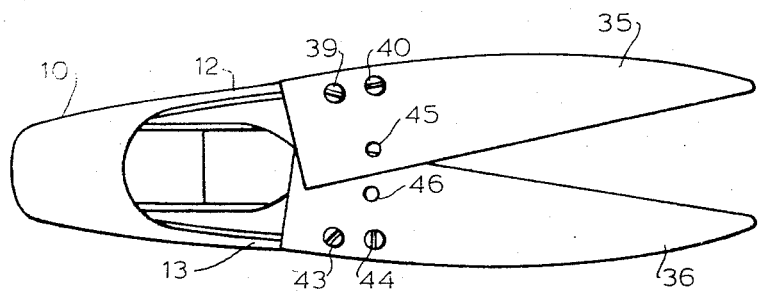
FIGURE 6 is a bottom view of the first embodiment of this invention showing the floating cutting blades being secured to the arm members of the trigger housing.

In operation, when the operator grasps trigger 20 and trigger housing 10, his knuckles trace a line which is substantially perpendicular to the plane in which blades 35 and 36 reside (FIGURE 2). Since pins 21 are rotatably received by holes 17, trigger 20 is adapted to pivot inwardly into trigger housing 10 upon being grasped and compressed by an operator. Upon the inward pivoting movement of trigger 20 toward trigger housing 10, T-shaped member 23 deforms to form substantially a Y thus bringing blades 35 and 36 inwardly and toward each other in a shearing relationship as shown in FIGURE 5. Since blades 35 and 36 are rigidly secured to base arms 12 and 13, base arms 12 and 13 become flexed and are subjected to a bending moment whereby upon the release of trigger 20, base arms 12 and 13 restore blades 35 and 36 to their normal open position.

Figure 14:
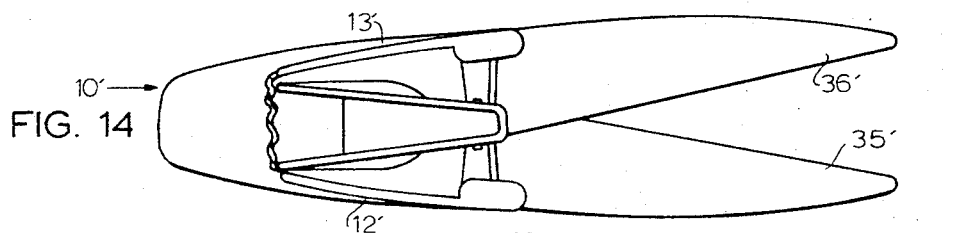
FIGURE 14 is a fragmentary view of FIGURE 12.
Figure 15:
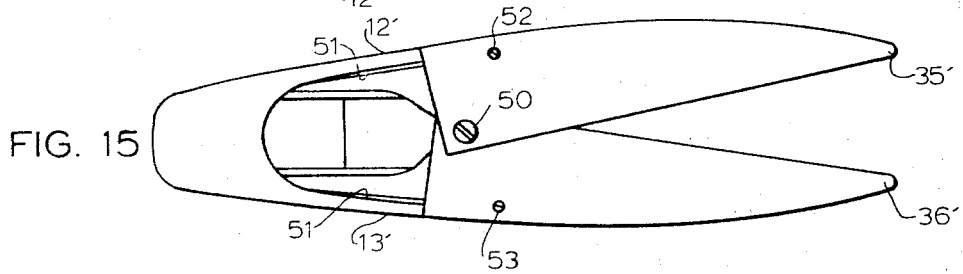
FIGURE 15 is a bottom view of the second embodiment of this invention showing the pivoted connection between the cutting blades.
Figure 12:
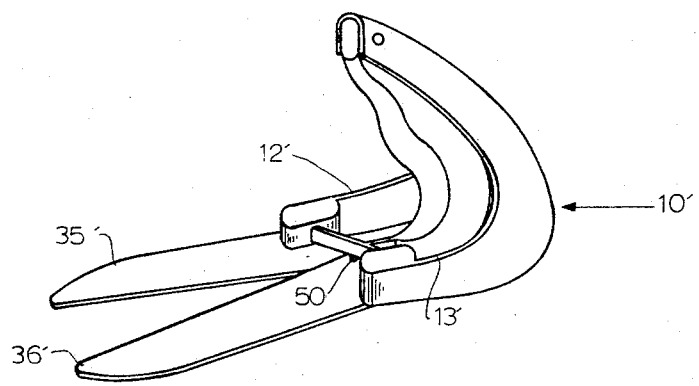
FIGURE 12 is a pictorial view of the second embodiment of this invention showing the cutting blades in an open position.
Figure 13:
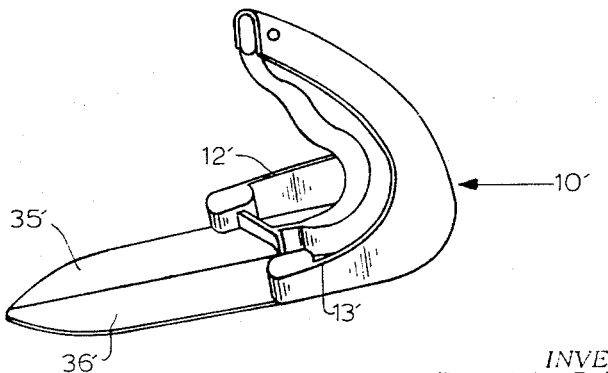
FIGURE 13 is a pictorial view of the second embodiment of the invention showing the cutting blades in a closed position.
Figure 16:
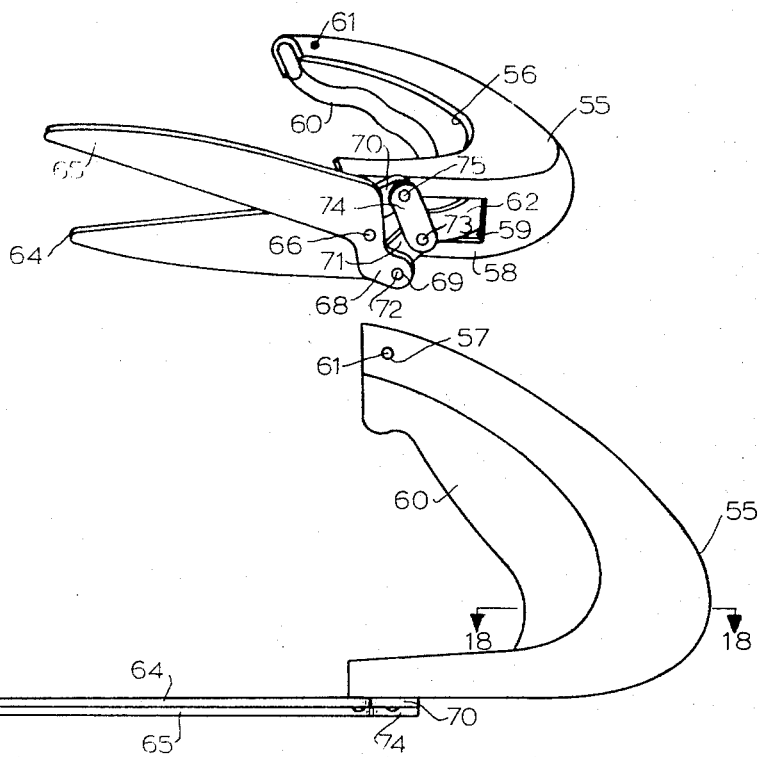
FIGURE 16 is a pictorial view of the third embodiment of the invention showing the linkage mechanism for operatively connecting the trigger and the cutting blades.
Figure 17:
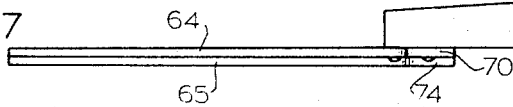
FIGURE 17 is a side elevation view of the third embodiment.
Figure 18:
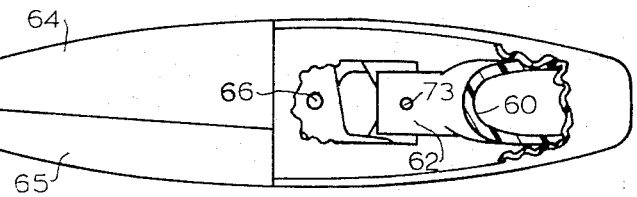
FIGURE 18 is a section view taken along lines 18—18 of FIGURE 17 and showing the lower portions of the trigger extending through the base of the trigger housing to be received by the blade linkage mechanism.

The second embodiment of this invention is substantially like the first embodiment with the exception that blades 35' and 36' as shown in FIGURES 14 and 15 are connected together by pivot pin 50 and base arms 12' and 13' are provided with a U-shaped steel spring member 51. Blades 35' and 36' are also pivotally secured to base arms 12' and 13' by means of pivot pins 52 and 53. Pivot pin 50 adapts blades 35' and 36' to close in a normal pivoting relationship as is common with grass shears of this type, thus insuring a more even shearing action. Since more resistance is encountered in closing blades 35' and 36', spring 51 which is partially molded into the body of trigger housing 10' aids in the return of blades 35' and 36' to their normal static position. Therefore, while there is a slight difference in the cutting or shearing action of the blades and the return of the blades to their normal resting position, the grass shears of the second embodiment function substantially like the grass shears of the first embodiment.

Figure 19:
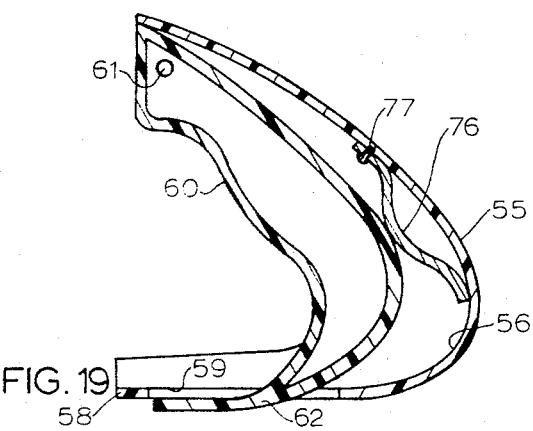
FIGURE 19 is a sectional view of the trigger and trigger housing assembly and showing the leaf spring for returning the cutting blades to their normally open position.
Figure 20:
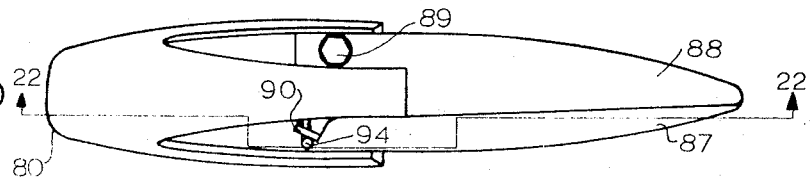
FIGURE 20 is a plan view of the fourth embodiment of this invention partially showing the linkage mechanism between the trigger and the singely pivoted blade when the blade is in a closed position.
Figure 21:
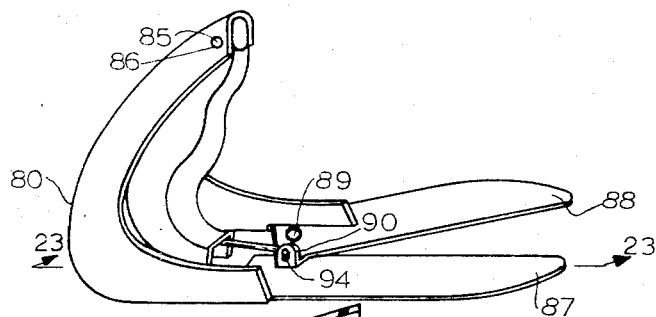
FIGURE 21 is a pictorial view of the fourth embodiment of this invention as shown in FIGURE 20 and showing the singlely pivoted blade in an open position.
Figure 22:
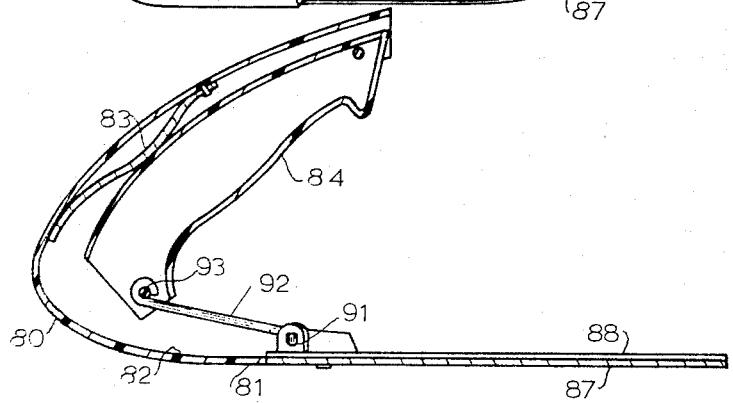
FIGURE 22 is a section view taken along lines 22—22 of FIGURE 20 and showing the leaf spring in a compressed position.
Figure 23:
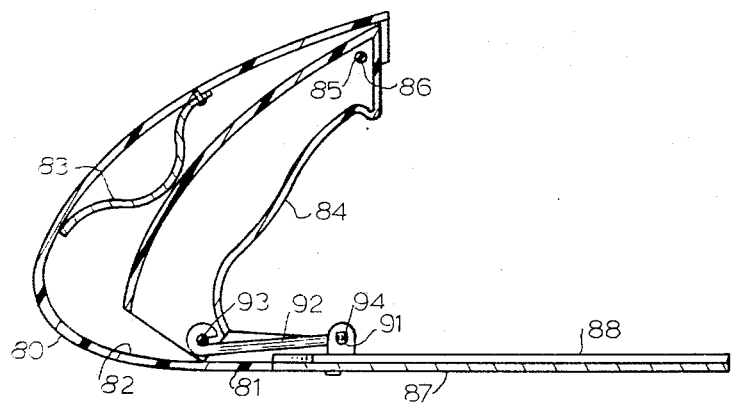
FIGURE 23 is a section view taken along lines 23—23 of FIGURE 21 and showing the leaf spring in a normal and static position.

The third embodiment of this invention includes a trigger housing 55 which is U-shaped in design and which defines a cavity 56. The upper portions of housing 55 are provided with openings 57 and the lower portion or base plate 58 of the same is provided with an opening 59. Trigger 60 which is arcuated in shape contourly conforms with trigger housing 55 and partially resides in cavity 56 and includes pins 61 which are adapted to pivotally reside in openings 57 and tongue 62 which extends through opening 59 in base plate 58. Cutting blades 64 and 65 are connected to each other and to base plate 58 by pivot pin 66. Blade 65 is provided with appendage 68 which extends rearwardly and diagonally of the same and is provided with an opening 69. Blade 64 is a mirror image of blade 65 and is provided with appendage 70 which also has an opening therein (not shown). Since appendages 68 and 70 extend rearwardly of pivot pin 66, the inward relative movement of appendages 68 and 70 results in the scissors-like closing of blades 65 and 64. Linkage 71 is pivotally connected to appendage 68 by pin 72 and to tongue 62 of trigger 60 by pin 73 and linkage 74 connects appendage 70 with tongue 62 by means of pins 75 and 73, respectively. As shown in FIGURE 19, trigger housing 55 is provided with leaf spring 76 which is rigidly mounted thereon by rivet 77 at one end and is slidable across the inner surface of trigger housing 55 at its free end.

In operation, as trigger 60 is drawn inwardly into cavity 56 of trigger housing 55, its rear portions engage and deform leaf spring 76 so that upon the release of trigger 60, it will return to its normal static position. As trigger 60 moves inwardly, tongue 62 by means of pivot pin 73 pulls linkages 74 and 71 rearwardly which in turn causes apendages 68 and 70 to pivot toward each other whereby blades 65 and 64 are closed in a shearing relationship. Upon the release of trigger 60, spring 76 forces trigger 60 to pivot outwardly thus returning blades 65 and 64 to their normal resting position by means of linkages 74 and 71 respectively pushing appendages 70 and 68 outwardly.

The fourth embodiment of this invention is shown in FIGURES 20, 21, 22 and 23. Trigger housing 80 is substantially the same as trigger housing 55 of the third embodiment with the exception that trigger housing 80 has a continuous base plate 81. Trigger housing 80 is provided with a cavity 82 in which resides leaf spring 83. Trigger 84 is pivotally mounted in cavity 82 of trigger housing 80 by means of pins 85 which are pivotally received by openings 86 in the upper portions of trigger housing 80. The back of trigger 84 rests against leaf spring 83 so that upon the movement of trigger 84 into cavity 82, leaf spring 83 returns the same to its original resting position upon the release of trigger 84. Floor 81 of trigger housing 80 includes an integrally and rigidly mounted blade 87. Movable blade 88 is pivotally mounted on floor 81 by means of pivot pin 89 and is adapted to cooperate with blade 87 in a shearing and cutting relationship. Blade 88 is provided at its rear with a perpendicularly arranged extension 90 which includes an opening 91 therein. An L-shaped connecting rod 92 is pivotally connected to trigger 84 at one end by pin means 93 and has its other end extending through opening 91 of perpendicular extension 90. Connecting rod 92 is provided on the end which extends through opening 91 with a vertical portion 94 which prevents connecting rod 92 from becoming disengaged with extension 90.

In operation, upon the operator grasping trigger housing 80 and trigger 84 such that an imaginary line traced by his knuckles is substantially perpendicular with blades 87 and 88, trigger 84 is pivoted inwardly or rearwardly about pins 85 in cavity 82 of trigger housing 80 whereupon leaf spring 83 is compressed. While trigger 84 is pivoting inwardly, connecting rod 92 pulls against vertical extension 90 such that blade 88 is pivoted about pivot pin 89 toward rigidly mounted blade 87 thus shearing any object which may be positioned between blades 87 and 88. When trigger 84 is released, leaf spring 83 by means of trigger 84 pushes connecting rod 92 outwardly and returns blade 88 to its normal open position.

It is considered to be within the scope of this invention to include other variations and modifications which, while departing from the structure as set forth, shall be within the scope of the claims as hereinafter set forth.

What is claimed is:
1. Clipping shears comprising:
 (a) a trigger housing having an elongated central U-shaped body portion normally positionable in a vertical plane and formed with flared sides providing a cavity, said cavity terminating at the top of said housing in a forward apex portion and at the bottom in an oppositely disposed normally horizontal base portion;
 (b) a trigger mounted forward of and shaped to conform to and partially residing in said cavity, said trigger having its upper end pivotally connected to said apex portion and its lower end positioned adjacent said base portion, the said shapes of said body portion and trigger being such that when gripped by one hand the knuckles thereof align themselves substantially perpendicular to said base portion;
 (c) a pair of cooperating cutting blades mounted on said base portion and operable in a plane perpendicular to the plane of said housing;
 (d) operator means operatively connecting at least one of said cutting blades with said lower end of the trigger and effective upon movement of the trigger rearwardly into said cavity to close said blades in a shearing relation; and
 (e) spring means incorporated in said housing and effective to hold said trigger in a forward position and said blades normally open.

2. The clipping shears of claim 1 wherein said base portion includes a pair of integral and substantially parallel resilient base arms extending forwardly to form continuations of said base portion and wherein said cutting blades are respectively mounted on said base arms.

3. The clipping shears of claim 2 wherein said operator means comprises a T-shaped member having flexible arms and a stem, said T-stem being integrally connected to and extending outwardly from said trigger lower end and parallel to said base portion, said T-arms being secured to respective ends of said base arms whereby upon the movement of said trigger rearwardly into said cavity said T-shaped member deflects and pulls said base arms inwardly to cause said cutting blades to close in a shearing relation.

4. The clipping shears of claim 3 wherein said spring means comprises said base arms.

5. The clipping shears of claim 3 wherein said blades and base portion are provided with a pivot pin, said pivot pin extending vertically through said blades and base portion whereby upon the movement of said trigger into said cavity, said blades pivot about said pin and close in a shearing relation.

6. The clipping shears of claim 5 including a U-shaped leaf spring mounted in said housing adjacent said base portion, said leaf spring including legs extending substantially the length of and secured to said base arms and a vertex portion connecting said legs and residing rearwardly of the said lower end of said trigger.

7. The clipping shears of claim 1 wherein said blades and base portion are provided with a pivot pin, said pivot pin extending vertically through said base portion and the rear portions of said cutting blades and adapting said cutting blades for pivotal motion whereby upon the movement of said trigger rearwardly into said cavity, said blades close in a shearing relation.

8. The clipping shears of claim 7 wherein said blades are each provided with integral appendages extending rearwardly and diagonally of said pivot pin and including linkage means connecting said appendages to said trigger lower end for operation of said blades.

9. The clipping shears of claim 8 wherein said base portion is provided with an opening, said trigger lower end extends through said opening, said blades are mounted on the bottom surface of said base and including linkages pivotally connecting each of said blade appendages with said trigger lower end whereby upon the pivotal movement of said trigger rearwardly into said cavity, said appendages are forced inwardly and close said blades in a shearing relation.

10. The clipping shears of claim 1 wherein one of said blades is rigidly mounted on said base portion and the other of said blades is pivotally mounted thereon, said pivotally mounted blade being connected to said trigger lower end so that upon the pivotal movement of said trigger into said cavity, said pivotally mounted blade is pivoted toward said rigidly mounted blade in a shearing relation.

11. The clipping shears of claim 10 wherein said spring means comprises an arcuated leaf spring residing in said cavity rearwardly of and resting against said trigger, said leaf spring having one end rigidly secured to and the other end slidably resting against said body portion.

12. The clipping shears of claim 11 wherein said pivotally mounted cutting blade is provided at the rear thereof with a vertical extension, a linkage bar pivotally connected at one end to said vertical extension and at the other end to said trigger lower end whereby upon the pivotal movement of said trigger rearwardly into said cavity, said pivotally mounted blade is pivoted toward said rigidly mounted blade in a shearing relation.

References Cited

UNITED STATES PATENTS

| | | | |
|---|---|---|---|
| 1,962,636 | 6/1934 | Clark | 30—248 |
| 2,680,293 | 6/1954 | Keller | 30—248 |
| 2,954,605 | 10/1960 | March | 30—248 |
| 3,296,697 | 1/1967 | Hedstrom | 30—248 |

ROBERT C. RIORDON, *Primary Examiner.*

J. C. PETERS, *Assistant Examiner.*

U.S. Cl. X.R.

30—248, 262